V. FERNÁNDEZ.
AUTOMOBILE GUARD.
APPLICATION FILED NOV. 29, 1919.
1,421,437.
Patented July 4, 1922.
2 SHEETS—SHEET 1.
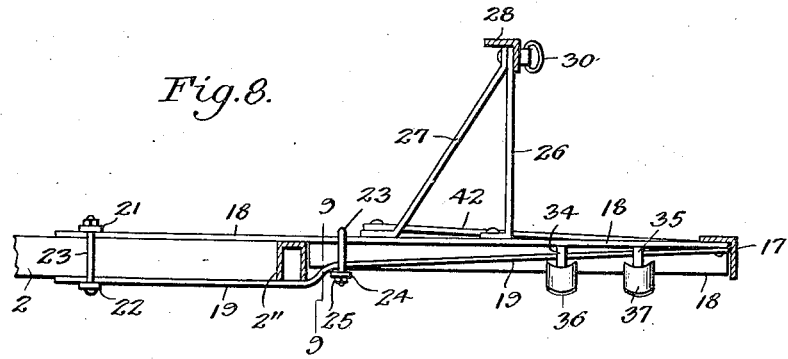
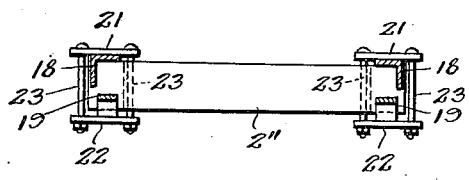
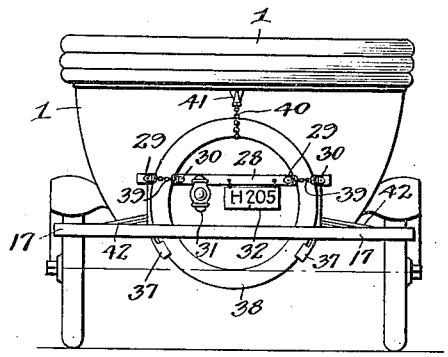
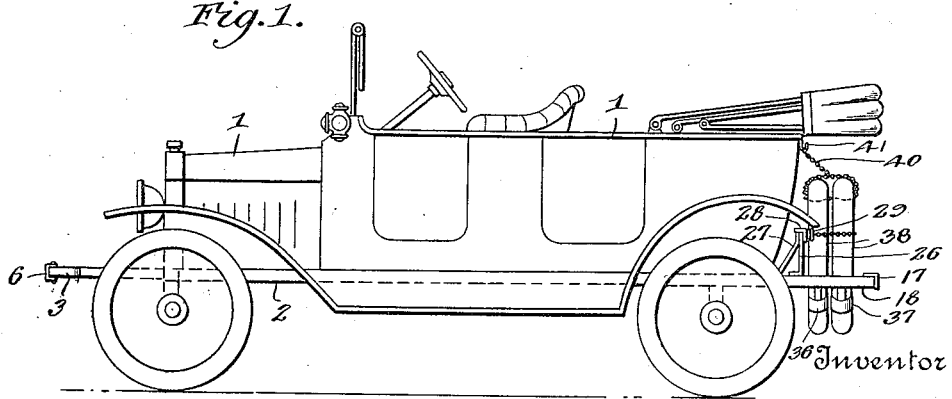
Inventor
Venerando Fernández
By B. Singer,
Attorney

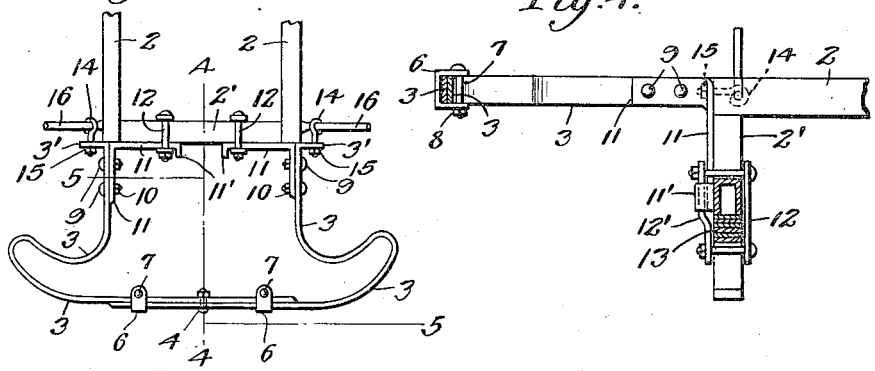

UNITED STATES PATENT OFFICE.

VENERANDO FERNÁNDEZ, OF HABANA, CUBA.

AUTOMOBILE GUARD.

1,421,437.  Specification of Letters Patent.  Patented July 4, 1922.

Application filed November 29, 1919. Serial No. 341,449.

*To all whom it may concern:*

Be it known that I, VENERANDO FERNÁNDEZ, a subject of the King of Spain, and resident of Habana, Cuba (whose post-office address is Zanja Street No. 154, Habana, Cuba), have invented certain new and useful Improvements in Automobile Guards, of which the following is a specification.

This invention relates to automobile guards and one object thereof is to provide a front guard for the automobile, to lessen the force of a collision.

Another object of this invention is to provide a rear guard for an automobile, which is of simple construction and serves as a tire-carrier as well as for holding the lamp and license tag.

In the annexed drawings illustrating the invention:

Fig. 1 is a side elevation of an automobile provided with the improved guards forming the subject-matter of this invention.

Fig. 2 is a rear elevation of the same automobile.

Fig. 3 is a detailed upper plan view of an automobile front guard, showing its connection to the front portion of the chassis.

Fig. 4 is an enlarged longitudinal vertical section on line 4—4 of Fig. 3.

Fig. 5 is an enlarged cross-vertical section on line 5—5 of Fig. 3.

Fig. 6 is a detailed upper plan view of an automobile rear guard, showing its connection to the rear portion of the chassis.

Fig. 7 is a rear elevation of said rear guard.

Fig. 8 is an enlarged longitudinal vertical section on line 8—8 of Fig. 6.

And Fig. 9 is a cross vertical section on line 9—9 of Fig. 8.

In the drawings 1 is an automobile whose chassis is 2, 3 indicates a front guard which is formed by two curved similarly shaped resilient plates the free ends of which are overlapped and secured together by a bolt 4 and C-shaped clamps 6 arranged on opposite sides of the bolt 4 at a certain distance therefrom and secured by means of bolts 7 which pass through holes in the horizontal portions of said clamps. Each one of the resilient plates 3 is secured by means of a pair of bolts 10 to an angular plate 11 one of whose branches is secured to the arched head cross-piece 2' of chassis 2 by means of clamp 12 which also hold this head piece 2' to the upper half of the spring 13 which rests and is fixed on the shaft of the front wheels of the automobile, each angular plate 11 having its inner end bent adjacent each clamp 12, thereby constituting a holding flange 11'. Each resilient plate has its rear end bent to form a transverse flange 3' which is connected by means of an eye-bolt 14 and a nut 15, to the curved rod 16 leading from each side bar of chassis 2 to hold the side mud guard of the automobile. It is seen that each clamp 12 has its fore plate 12' outwardly and upwardly bent so as to leave ample space for lodging the arched portion of the union angular plate 11 and thus preventing the latter from vertically sliding out. In this manner, owing to the lateral holding point which each resilient plate has in the eyebolt 14, the same can not move in any direction.

The rear automobile guard consists in an angular cross-section transverse bar 17 which is held at a certain distance behind the chassis of the automobile by means of two supporting arms arranged in alinement with each side bar of the chassis 2 and each one of which is formed by an angular cross-section bar 18 whose vertical portion is cut off at a certain extension and laps at its free horizontal portion the upper part of the side bar of chassis 2, and by a small plate 19 which is arranged underneath the lower portion of the side bar of chassis 2 and is curved at its middle portion beyond the rear head cross-piece 2'' of chassis 2 to engage the horizontal portion of an angular cross-section bar 18 underneath the horizontal portion of the cross-angular bar 17, where they are secured to the latter by means of a bolt screw 20. The free horizontal portion of each angular cross-section bar 18 and the lower small plate 19 are connected to the respective side bars of chassis 2 by means of a clamp formed by two plates, an upper one 21 and a lower one 22 connected together by bolts 23 through holes thereon and adjacent the sides of side bar 2'. Also the angular cross-section bar 18 and small plate 19 are connected together by a clamp 23, whose ends are connected by a small horizontal plate 24 against which are tightened nuts 25 screwed on the threaded ends of said clamp. On each plate standard 26 on the middle point of the projecting portion of each angular cross-section bar 18 and re-inforced by rods 27, there is fixed at a certain height above the same a transverse angular cross-section bar 28 having at each end a pair of pivotally mouthed rings 29 and 30, and on the same bar are hung the lamp 31 and license tag 32. Beneath the horizontal portion of each side angular cross-section bar 18 and in the section thereof comprised between each standard 26 and cross-bar 17, there are fixed by means of bolt screws 33 a couple of hanging plates of downwardly and inwardly arched shape 34 and 35 which terminate in arched channels 36 and 37, those of one side being separated from those on the other side at a distance which should be less than the diameter of the tires 38 of the automobile wheels. In this manner a pair of tires 38 can be carried in vertical position on the channels 36 and 37 of both sides, and the same tires are secured by means of chains 39 fastened to the rings 29 and 30 and also by means of another chain 40, securing both tires at its upper part and fastened to a hook 41 behind the back of the automobile casing.

The laterally projecting end portions of the cross-bar 17 are re-inforced by means of stay plates 42 which are fixed at one end by means of a bolt 43 beneath the horizontal portion of said bar 17 and at the other end are mounted above the foot of the stay 27 and are secured by the same bolt which holds the latter.

Owing to the arrangmeent of the rear frame, the lamp 31 and license tag 32, as well as the casing, are protected against the effects of shocks or collisions.

It is obvious that the details of construction of the front and rear guards of the automobile can be slightly varied without altering the spirit of the invention, which is as pointed out in the appended claim.

What I claim is:

A rear automobile guard comprising a pair of extension arms, means to secure the front ends of the same to the rear portions of the side bars of a chassis, a cross bar connecting the rear ends of the extension arms, standards on the extension arms at points spaced from their rear ends, a transverse bar connecting the upper ends of the standards and provided with tire securing means, and tire supporting stirrups attached to the said extension arms and arranged therebetween.

In witness whereof I affix my signature.

VENERANDO FERNÁNDEZ